(12) United States Patent
Tapaninaho

(10) Patent No.: US 10,941,945 B2
(45) Date of Patent: Mar. 9, 2021

(54) COOKING APPARATUS

(71) Applicant: UUNI LIMITED, West Lothian (GB)

(72) Inventor: Matti Kristian Tapaninaho, West Lothian (GB)

(73) Assignee: OONI LIMITED, West Lothian (GB)

(*) Notice: Subject to any disclaimer, the term of this patent is extended or adjusted under 35 U.S.C. 154(b) by 3 days.

(21) Appl. No.: 16/067,535

(22) PCT Filed: Dec. 23, 2016

(86) PCT No.: PCT/GB2016/054062
§ 371 (c)(1),
(2) Date: Jun. 29, 2018

(87) PCT Pub. No.: WO2017/115084
PCT Pub. Date: Jul. 6, 2017

(65) Prior Publication Data
US 2019/0049117 A1 Feb. 14, 2019

(30) Foreign Application Priority Data

Dec. 31, 2015 (GB) ...................... 1523175

(51) Int. Cl.
*F24B 5/06* (2006.01)
*A47J 37/07* (2006.01)
(Continued)

(52) U.S. Cl.
CPC ................ *F24B 5/06* (2013.01); *A21B 1/28* (2013.01); *A47J 37/0704* (2013.01); *F24B 1/20* (2013.01); *Y02A 40/928* (2018.01)

(58) Field of Classification Search
CPC ...... F24B 1/20; F24B 1/22; F24B 5/20; F24C 15/32; A47J 37/0704; Y02A 40/928
See application file for complete search history.

(56) References Cited

U.S. PATENT DOCUMENTS 3,699,876 A 10/1972 Ellis
3,796,549 A * 3/1974 Hall ...................... B01D 47/06
422/169
(Continued)

FOREIGN PATENT DOCUMENTS

DE 20317621 U1 2/2004
DE 102005060134 A1 6/2007
(Continued)

OTHER PUBLICATIONS

International Search Report for Application No. PCT/GB2016/054062; dated Jun. 5, 2017.
(Continued)

*Primary Examiner* — David J Laux
*Assistant Examiner* — Nikhil P Mashruwala
(74) *Attorney, Agent, or Firm* — Ferguson Case Orr Paterson

(57) ABSTRACT

Cooking apparatus comprises an oven. The oven comprises a cooking chamber, a heated air source, a flue, and a baffle. The cooking chamber extends between the heated air source and the flue, thereby defining, in use, a heated air flow path between said heated air source and said flue. The baffle is reversibly deployable in said heated air flow path to deflect heated air, thereby causing recirculation of heated air within the cooking chamber.

14 Claims, 11 Drawing Sheets

(51) Int. Cl.
*F24B 1/20* (2006.01)
*A21B 1/28* (2006.01)

(56) References Cited

U.S. PATENT DOCUMENTS

| | | | | |
|---|---|---|---|---|
| 3,987,786 | A * | 10/1976 | Keyes | F24S 60/00 |
| | | | | 126/400 |
| 4,223,659 | A * | 9/1980 | Livezey | F24B 1/1886 |
| | | | | 126/66 |
| 4,611,572 | A * | 9/1986 | Martenson | F24B 5/02 |
| | | | | 126/60 |
| 4,766,876 | A * | 8/1988 | Henry | F24B 5/026 |
| | | | | 126/193 |
| 5,042,457 | A * | 8/1991 | Gallagher | F24C 15/20 |
| | | | | 126/299 E |
| 5,481,964 | A | 1/1996 | Kitten | |
| 6,813,995 | B1 * | 11/2004 | Sikes | A47J 37/07 |
| | | | | 126/21 R |
| 9,635,978 | B2 * | 5/2017 | Measom | A47J 37/0704 |
| 9,668,615 | B2 * | 6/2017 | Contarino, Jr. | A47J 37/0786 |
| 9,844,300 | B2 * | 12/2017 | Cedar | F23L 5/02 |
| 10,405,699 | B2 * | 9/2019 | Contarino, Jr. | A47J 37/0786 |
| 10,694,892 | B2 * | 6/2020 | Colston | A47J 36/38 |
| 2005/0155498 | A1 | 7/2005 | Killion | |
| 2012/0012096 | A1 | 1/2012 | Cusack | |
| 2017/0164783 | A1 * | 6/2017 | Sauerwein | A47J 37/0786 |
| 2018/0028018 | A1 * | 2/2018 | Barnett | A47J 37/0786 |
| 2020/0237154 | A1 * | 7/2020 | Donnelly | A47J 36/32 |

FOREIGN PATENT DOCUMENTS

| | | |
|---|---|---|
| FR | 2670870 A1 | 6/1992 |
| FR | 2661236 A1 | 10/1995 |
| GB | 2350181 | 11/2000 |
| WO | WO 2017/115084 A1 | 7/2017 |

OTHER PUBLICATIONS

Examination Report for Application No. EP 16828964.3; dated Feb. 26, 2020.

* cited by examiner

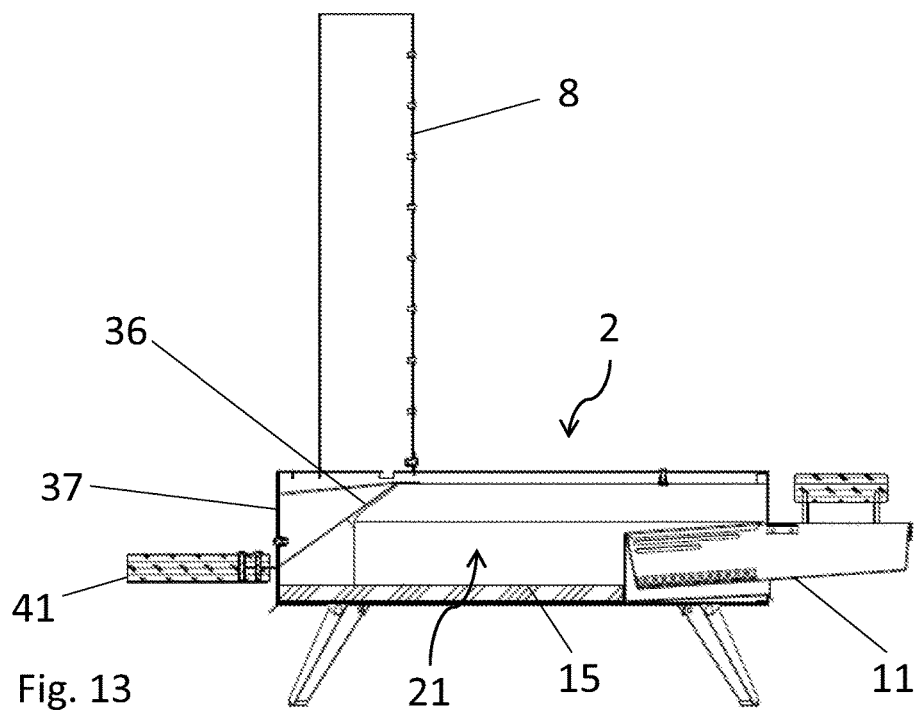
Fig. 13
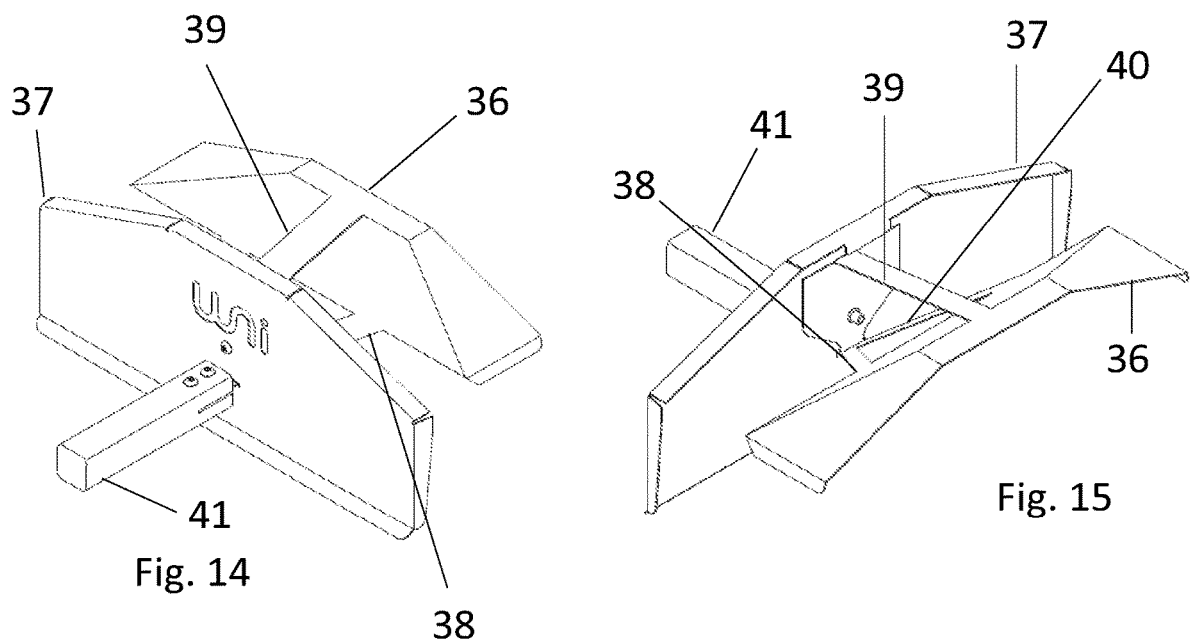
Fig. 14
Fig. 15

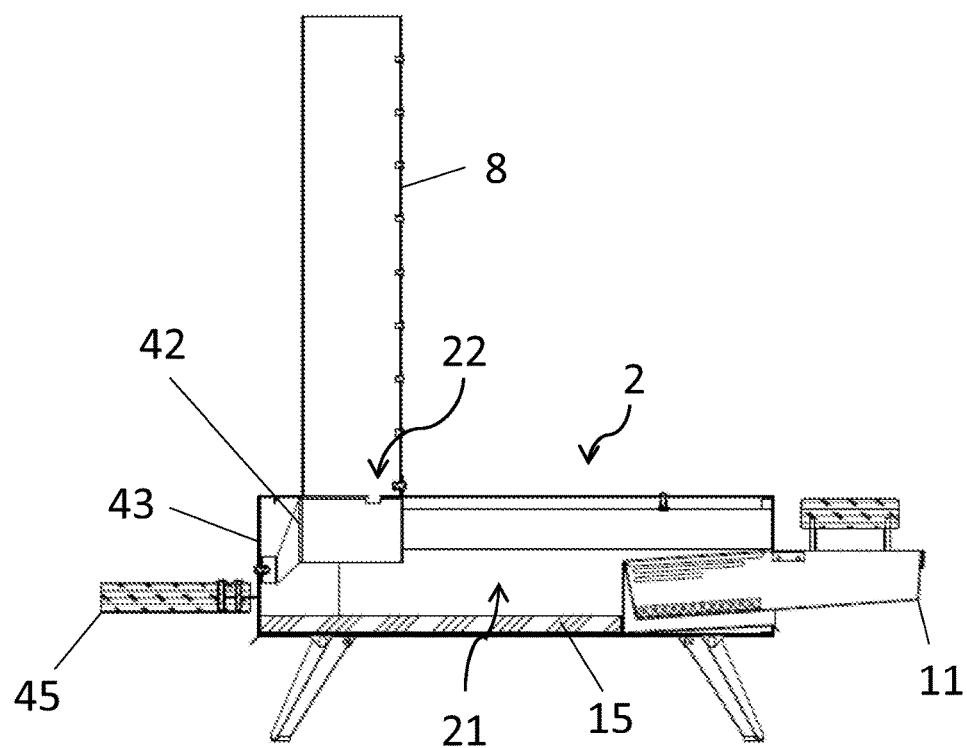
Fig. 16
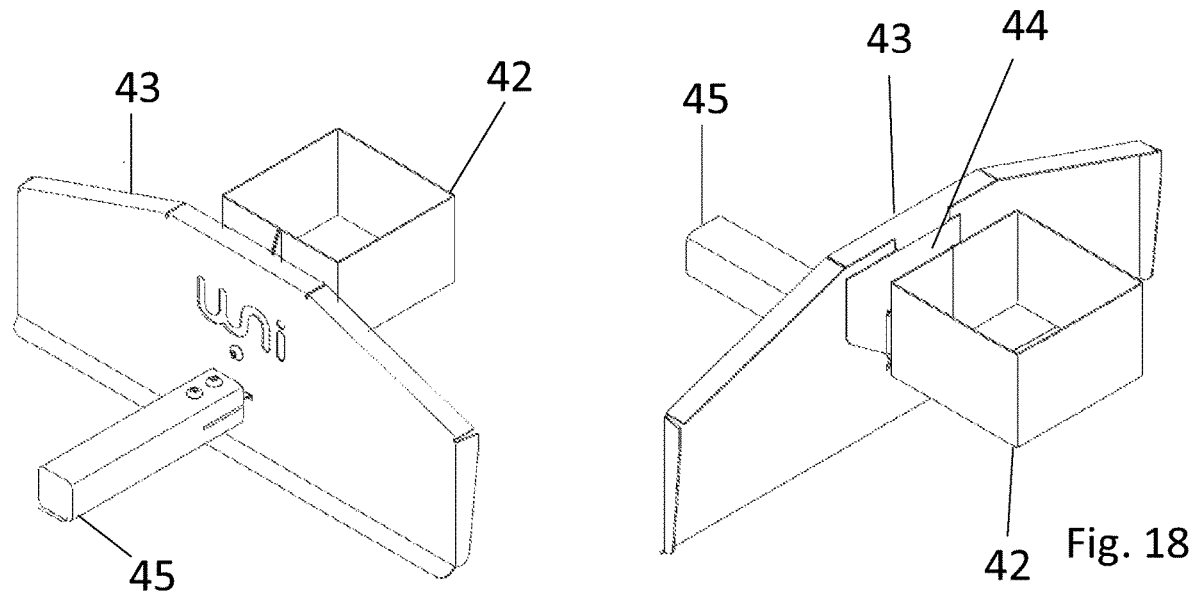
Fig. 17
Fig. 18

COOKING APPARATUS

This application is a National stage application of PCT/GB2016/054062 filed Dec. 23, 2016, which claims the benefit of Great Britain (GB) Patent Application No. 1523175.6 filed on Dec. 31, 2015. All applications referred to in this paragraph are incorporated by reference as if set forth fully herein.

FIELD OF THE INVENTION

The present invention relates to the field of cooking apparatus, and in particular, cooking apparatus comprising an oven, as well as modular cooking apparatus comprising an oven unit and a stove top unit.

BACKGROUND TO THE INVENTION

Wood-fired ovens are commonly used in commercial kitchens for the cooking of baked goods and, in particular, pizzas. Such ovens provide the very high temperatures required to cook pizzas (and other dough-based products) adequately and to provide the pizzas with a characteristically smoky or charred flavour. However, wood-fired ovens are typically too large and expensive for domestic use.

Smaller and more economical wood-fired ovens adapted for domestic use or for portability (for example, for use at picnics or when camping) have been devised. Such portable wood-fired ovens are typically better at cooking pizzas than conventional domestic ovens (e.g. gas or electric domestic ovens). Nevertheless, it is still difficult to achieve the temperatures required for an optimum pizza cooking result (as is achieved in a commercial kitchen) without using substantial quantities of fuel (i.e. wood).

The present invention aims to provide an improved oven which permits higher cooking temperatures to be achieved with a smaller quantity of fuel. Some embodiments of the invention aim to provide multi-use portable cooking apparatus. Some embodiments of the invention aim to reuse heated air generated to warm an oven in order to reduce waste. Some embodiments of the invention aim to improve the design and function of portable ovens.

SUMMARY OF THE INVENTION

A first aspect of the invention provides cooking apparatus comprising an oven, the oven comprising a cooking chamber, a heated air source, a flue, and a baffle, the cooking chamber extending between the heated air source and the flue, thereby defining, in use, a heated air flow path between said heated air source and said flue, the baffle being reversibly deployable (e.g. removably deployable) in said heated air flow path to deflect heated air (within the cooking chamber). In use, deflection of heated air by the baffle, when deployed in the heated air flow path, causes recirculation of heated air within the cooking chamber, thereby increasing retention of heated air.

When the baffle is deployed in the heated air flow path in use, the baffle typically deflects heated air flowing in the heated air flow path (from the heated air source towards the flue) away from the flue. It may be that the baffle deflects all of the heated air flowing in the heated air flow path (from the heated air source towards the flue) away from the flue. Alternatively, it may be that the baffle deflects only a portion of the heated air flowing in the heated air flow path (from the heated air source towards the flue) away from the flue. For example, it may be that the baffle deflects at least 10%, or more preferably at least 20%, or more preferably at least 30%, or more preferably at least 40%, or more preferably at least 50%, or more preferably at least 60%, or more preferably at least 70%, or more preferably at least 80%, or more preferably at least 90%, of the heated air flowing in the heated air flow path (from the heated air source towards the flue) away from the flue.

In any such embodiment, deflection of heated air away from the flue typically causes recirculation of heated air within the cooking chamber. A total heated air flow path length for heated air travelling from the heated air source to the flue is therefore increased by the baffle deflecting heated air away from the flue. Heated air therefore spends more time in the cooking chamber before escaping from said cooking chamber through the flue (e.g. a heated air residence time within the cooking chamber is increased by the baffle deflecting heated air away from the flue). Accordingly, the average temperature of air within the cooking chamber is typically increased by the baffle deflecting heated air away from the flue. Additionally, recirculation of heated air within the cooking chamber typically results in a more even heat distribution within the cooking chamber. The efficacy and the efficiency of the cooking chamber in the cooking of foods is therefore typically increased by the baffle deflecting heated air away from the flue. This effect is typically enhanced when the cooking chamber is used to cook baked goods and, in particular, breads or pizzas which require very high cooking temperatures for a satisfactory cooking result. For example, pizzas cooked at higher temperatures (e.g. 450° C. and higher) typically have a crispy base and/or crust with an interior that is light and not dense or overly chewy. In comparison, pizzas cooked at lower temperatures (e.g. 250° C.) must typically be cooked for longer times, allowing moisture to evaporate from the pizza dough, resulting in a dense and overly chewy crust.

It will be understood that by describing the baffle as 'reversibly deployable' in the heated air flow path, it is meant that deployment of the baffle in the heated air flow path may be reversed, i.e. undone. Reversal of deployment of the baffle may comprise removal of the baffle from the heated air flow path or reconfiguration of the baffle. Accordingly, the baffle may be removably deployable or selectively deployable in said heated air flow path.

Since the baffle is reversibly deployable, the baffle need only be deployed in the heated air flow path when recirculation of heated air within the cooking chamber is necessary. Accordingly, the oven can also be used for cooking food products which do not require recirculation of the heated air and/or such high cooking temperatures as can be achieved by recirculation of the heated air. Additionally, it may be that, when the baffle is deployed in the heated air flow path, the baffle impedes user access to the cooking chamber (for example for the provision, inspection or removal of food products before, during or after cooking), and by providing a baffle which is reversibly deployable in the heated air flow path, the user may (temporarily) reverse the deployment of the baffle from the heated air flow path, thereby providing unimpeded access to the cooking chamber.

It may be that the baffle is reversibly deployable in a deflecting configuration in said heated air flow path. The deflecting configuration is typically a configuration in which the baffle is configured to deflect heated air (within the cooking chamber), thereby causing recirculation of heated air within the cooking chamber. For example, it may be that the position of the baffle is configured, when the baffle is deployed in the deflecting configuration, such that the baffle deflects heated air (within the cooking chamber). It may be that the orientation of the baffle is configured, when the baffle is deployed in the deflecting configuration, such that the baffle deflects heated air (within the cooking chamber). It may be that the shape of the baffle is configured, when the baffle is deployed in the deflecting configuration, such that the baffle deflects heated air (within the cooking chamber).

It may be that the configuration of the baffle is switchable between the deflecting configuration and an air flow configuration. The air flow configuration is typically a configuration in which that baffle is configured such that deflection of heated air (within the cooking chamber) by the baffle is reduced (in comparison to when the baffle is deployed in the deflecting configuration). For example, it may be that the position and/or orientation and/or shape of the baffle is configured, when the baffle is deployed in the air flow configuration, such that deflection of heated air (within the cooking chamber) by the baffle is reduced (in comparison to when the baffle is deployed in the deflecting configuration).

It may be that switching the configuration of the baffle from the deflecting configuration to the air flow configuration comprises (constitutes) reversing deployment of the baffle from in the heated air flow path. Similarly, it may be that switching the configuration of the baffle from the air flow configuration to the deflecting configuration comprises (constitutes) deploying the baffle in the heated air flow path.

It may be that (at least a portion of) the baffle is reversibly deployable (e.g. positionable) in a deflecting position in said heated air flow path (between the heated air source and the flue), in which the baffle deflects heated air (within the cooking chamber), thereby causing recirculation of heated air within the cooking chamber. It may be that more than one portions of the baffle are reversibly deployable (e.g. positionable) in said deflecting position. It may be that a majority of the baffle is reversibly deployable (e.g. positionable) in said deflecting position. It may be that the entire baffle is reversibly deployable (e.g. positionable) in said deflecting position.

It may be that (the at least a portion of) the baffle is deployed (e.g. positioned) in the deflecting position in the heated air flow path (between the heated air source and the flue), in which the baffle deflects heated air (within the cooking chamber), when said baffle is deployed in the deflecting configuration. Accordingly, it may be that deployment of the baffle in the deflecting configuration in the heated air flow path comprises deployment (e.g. positioning) of (the at least a portion of) the baffle in the deflecting position in said heated air flow path.

It may be that (the at least a portion of) the baffle extends into the deflecting position in the heated air flow path (between the heated air source and the flue) when said baffle is deployed in the deflecting configuration. Accordingly, it may be that deployment of the baffle in the deflecting configuration in the heated air flow path comprises extension of (the at least a portion of) the baffle into the deflecting position in said heated air flow path.

Typically, the greater the proportion of the baffle which is deployed in (e.g. positioned in or extends into) the deflecting position when the baffle is deployed in the deflecting configuration, the greater the deflection of heated air by the baffle. For example, it may be that the greater the surface area of the baffle which is exposed to the heated air flowing from the heated air source towards the flue when the baffle is deployed (e.g. positioned in or extends into) in the deflecting position, the greater the deflection of heated air by the baffle.

It may be that the (at least a portion of) the baffle is moveable between the deflecting position and an air flow position in which deflection of heated air by the baffle is reduced (in comparison to deflection of heated air when the baffle is deployed (e.g. positioned) in the deflecting position). It may be that more than one portions of the baffle are moveable between said deflecting and air flow positions. It may be that a majority of the baffle is moveable between said deflecting and air flow positions. It may be that the entire baffle is moveable between said deflecting and air flow positions.

It may be that the (at least a portion of the) baffle is (at least partially) retracted from the heated air flow path when said baffle is deployed (e.g. positioned) in the air flow position. It may be that more than one portions of the baffle are retracted from the heated air flow path when the baffle is deployed (e.g. positioned) in the air flow position. It may be that a majority of the baffle is retracted from the heated air flow path when the baffle is deployed (e.g. positioned) in the air flow position. It may be that the entire baffle is retracted from the heated air flow path when the baffle is deployed (e.g. positioned) in the air flow position.

It may be that (the at least a portion of) the baffle is provided in the air flow position when the baffle is deployed in the air flow configuration.

Typically, the greater the proportion of the baffle which is retracted from the heated air flow path in the air flow position, the lower the deflection of heated air by the baffle in said position. For example, it may be that the greater the surface area of the baffle which is withdrawn from the heated air flowing from the heated air source towards the flue when the baffle is positioned in the air flow position, the lower the deflection of heated air by the baffle in said position.

It may be that movement of the baffle (or one or more portions thereof) between the deflecting and air flow positions comprises movement of said baffle (or one or more portions thereof) between a position outside the cooking chamber and a position within the cooking chamber. For example, it may be that said movement of the baffle (or one or more portions thereof) between the deflecting and air flow positions comprises movement of said baffle (or one or more portions thereof) between a position outside the oven and a position within the oven (i.e. within the cooking chamber).

It may be that movement of the baffle (or one or more portions thereof) between the deflecting and air flow positions comprises vertical displacement of said baffle (or one or more portions thereof) within the oven and/or within the cooking chamber.

It may be that movement of the baffle (or one or more portions thereof) between the deflecting and air flow positions comprises rotation of said baffle (or one or more portions thereof) within the oven and/or within the cooking chamber. For example, it may be that movement of the baffle (or one or more portions thereof) between the deflecting and air flow positions comprises rotation of said baffle (or one or more portions thereof) about a pivot provided within the oven and/or within the cooking chamber (said pivot being provided on a ceiling of the cooking chamber, for example). The pivot may comprise a hinge.

It may be that the (at least a portion of the) baffle depends (i.e. extends downwards) from a ceiling of the cooking chamber (or a roof of the oven) when the baffle is deployed in the heated air flow path. For example, it may be that the (at least a portion of the) baffle depends from the ceiling of the cooking chamber (or the roof of the oven) between the heated air source and the flue when the baffle is deployed in the heated air flow path. It may be that the (at least a portion of the) baffle depends from the ceiling of the cooking chamber (or the roof of the oven) (between the heated air source and the flue) when the baffle is deployed in the deflecting configuration. It may be that the (at least a portion of the) baffle depends from the ceiling of the cooking chamber (or the roof of the oven) (between the heated air source and the flue) when the baffle is deployed (e.g. positioned) in the deflecting position.

It may be that the (at least a portion of the) baffle depends from the ceiling of the cooking chamber (or the roof of the oven) at a first end of said cooking chamber, said first end being immediately adjacent to the flue, when the baffle is deployed in the heated air flow path (e.g. when the baffle is deployed in the deflecting configuration and/or or when the baffle is deployed (e.g. positioned) in the deflecting position). Accordingly, it may be that the (at least a portion of the) baffle wall depends from the ceiling of the cooking chamber (or the roof of the oven) between the ceiling of the cooking chamber and the flue, when the baffle is deployed in the heated air flow path (e.g. when the baffle is deployed in the deflecting configuration and/or or when the baffle is deployed (e.g. positioned) in the deflecting position).

It may be that the oven further comprises an oven door. Said oven door is typically moveable between a closed position, in which the cooking chamber is sealed from an external atmosphere (outside the oven), and an open position, in which the cooking chamber is externally accessible (from outside the oven).

The oven door typically removably seals a food-receiving opening of the oven (and/or the cooking chamber) when the oven door is provided in the closed position. The food-receiving opening is typically accessible by a user (for example, for the provision, inspection or removal of food items within the cooking chamber) when the oven door is provided in the open position.

The oven door may be hingedly attached to the oven, such that moving the oven door between the open and closed positions comprises rotating the oven door about a hinge. Alternatively, the oven door may be releasably mountable within the food-receiving opening such that moving the oven door between the open and closed positions comprises mounting and/or unmounting the oven door within the food-receiving opening.

It may be that the oven door comprises a handle, for example a thermally-insulated handle.

It may be that movement of the oven door from the open position to the closed position causes corresponding reversible deployment of the baffle into the heated air flow path (e.g. into the deflecting configuration and/or the deflecting position). It may be that movement of the oven door from the closed position to the open position causes corresponding reversal of deployment of the baffle from the heated air flow path (e.g. out of the deflecting configuration and/or the deflecting position).

It may be that movement of the oven door between the closed position and the open position causes corresponding switching of the configuration of the baffle between the deflecting and air flow configurations. For example, it may be that movement of the oven door between the closed position and the open position causes corresponding movement of the baffle between the deflecting and air flow positions.

It may be that the baffle is positioned so as to deflect heated air flowing from the heated air source towards the flue when the oven door is closed, and that the baffle is further positioned so as not to deflect (at least a portion of) said heated air when the oven door is open (i.e. such that heated air flowing from the heated air source flows towards the flue undeflected by the baffle when the oven door is open). This typically provides a user with more (vertical) space to insert or remove food items from the cooking chamber when the door is open, but also permits heated air recirculation within the cooking chamber (and thus typically permits higher cooking temperatures to be achieved) when the door is closed.

It may be that the baffle is coupled to the oven door. For example, it may be that the baffle is coupled to a cooking chamber face of said oven door (said cooking chamber face of said oven door being opposite a front face of said oven door) which is internal to the oven during use (i.e. during cooking). It may be that the baffle is (fixedly) attached to the oven door. For example, it may be that baffle is (fixedly) attached to the cooking chamber face of the oven door. It may be that the baffle is integrally formed with the baffle door. Alternatively, it may be that the baffle is removable from the oven door. For example, it may be that the baffle is removably mounted on said oven door.

It may be that the heated air source is provided at a lower (vertical) height than the flue such that heated air flowing from the heated air source flows upwards through the cooking chamber towards the flue. That is to say, it may be that the heated air flow path extends upwards from the heated air source towards the flue. Since heated air is typically less dense than cooler air, heated air typically rises above cooler air. Accordingly, without the baffle, heated air would typically tend to flow upwards away from the heated air source towards and into the flue, without spending a significant period of time within the cooking chamber. The (at least a portion of the) baffle may therefore be positioned in an upper half of the cooking chamber, or more preferably at the top of the cooking chamber (e.g. at or depending from the ceiling of the cooking chamber), when the baffle is deployed in the heated air flow path (e.g. in the deflecting configuration and/or position), to thereby deflect heated air flowing from the heated air source towards the flue along the top (i.e. immediately beneath the ceiling) of the cooking chamber.

It may be that deflection of heated air flowing from the heated air source towards the flue by the baffle, when said baffle is deployed in the heated air flow path (e.g. in the deflecting configuration and/or deflecting position), causes recirculation of heated air within an upper portion of the cooking chamber. For example, it may be that deflection of heated air (flowing from the heated air source towards the flue) by the baffle, when the baffle is deployed in the heated air flow path, causes recirculation of heated air within an uppermost portion of the cooking chamber. Preferably, however, deflection of heated air (flowing from the heated air source towards the flue) by the baffle, when said baffle is deployed in the heated air flow path, causes recirculation of heated air within a majority of the cooking chamber. For example, it may be that deflection of heated air (flowing from the heated air source towards the flue) by the baffle, when said baffle is deployed in the heated air flow path, causes recirculation of heated air within the entire cooking chamber.

When the baffle is deployed in the heated air flow path, recirculation of heated air within (an upper (most) portion) of the cooking chamber typically also causes preferential displacement of cooler (e.g. cooled), and thus less dense, air from the cooking chamber into the flue.

It may be that the heated air source is provided in a lower portion of the oven (e.g. at a base of the oven) and the flue is provided in an upper portion of the oven (e.g. at or immediately below a ceiling and/or roof of the oven), the baffle being provided in said upper portion of the oven (e.g.

at or immediately below the ceiling and/or roof of the oven) between the heated air source and the flue, the baffle being reversibly deployable in the heated air flow path in said upper portion of the oven (e.g. at or immediately below the ceiling and/or roof of the oven). It may be that the heated source and the flue are laterally displaced from one another (i.e. displaced in a horizontal direction perpendicular to a height of the oven and/or cooking chamber), the baffle being provided laterally between the flue and the heated air source such that the baffle is reversible deployable in the heated air flow path between the heated air source and the flue.

It may be that the flue is provided (laterally, i.e. in a horizontal direction) between the baffle and the food-receiving opening of the oven. It may be that the flue is provided (laterally, i.e. in a horizontal direction) between the baffle and the oven door.

Accordingly, it may be that the baffle is provided (laterally, i.e. in a horizontal direction) between the food-receiving opening of the oven (and/or the oven door) and the heated air source.

It may be that deflection of heated air by the baffle, when the baffle is deployed in the heated air flow path, generates a pocket of recirculating heated air within the cooking chamber. For example, it may be that deflection of heated air by the baffle, when the baffle is deployed in the heated air flow path, generates a pocket of recirculating heated air within the upper portion of the cooking chamber.

It may be that the baffle forms part of a flue extender. The flue extender typically comprises one or more (vertical) walls arranged to form a (vertical) channel, positionable below the vent (i.e. below the entrance to the flue) within the oven (i.e. within the cooking chamber). Typically, the flue extender effectively lowers the (vertical) height at which air flows into the flue. It may be that when the flue extender is provided beneath the vent to thereby extend the flue, the baffle is deployed in the heated air flow path (e.g. in the deflecting configuration and/or deflecting position), and when the flue extender is removed from beneath the vent, the baffle is retracted from the heated air flow path (e.g. out of the deflecting configuration and/or deflecting position and into the air flow configuration and/or air flow position).

It may be that the baffle is removably deployed in the heated air flow path to deflect heated air.

It may be that the oven comprises baffle retaining means. It may be that the baffle is removably retained (within the oven) by said baffle retaining means (when the baffle is removably deployed in the heated air flow path).

It may be that the oven comprises baffle receiving means. It may be that the baffle is removably received by the baffle receiving means (when said baffle is removably deployed in the heated air flow path).

It may be that the oven comprises one or more baffle retaining formations configured to releasably retain the baffle (within the oven) in the heated air flow path (when said baffle is removably deployed in the heated air flow path).

It may be that said baffle retaining means, said baffle receiving means, and/or said one or more baffle retaining formations are provided on or within, or are integrally formed with (a wall and/or the ceiling of), the cooking chamber.

It may be that the oven is (configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that that a (external) housing of the oven is (thermally) insulated such that a user may safely handle one or more external portions of the oven during use.

It may be that the oven is a pizza oven. It may be that the cooking chamber is configured for cooking one or more pizzas. It may be that the cooking chamber is dimensioned and sized for cooking one or more pizzas. A cooking chamber configured for cooking one or more pizzas typically has a (interior) length and/or a (interior) breadth (substantially) greater than a (interior) vertical height of the cooking chamber.

It may be that the heated air source comprises a fuel burner. The fuel burner may be configured to burn one or more of the following combustible fuels: wood chips, wood pellets, coal, split wood, twigs, gas, oil. Alternatively, the heated air source may be an electrical heated air source comprising an electric heating element.

A second aspect of the invention provides modular cooking apparatus comprising an oven unit and a stove top unit, the oven unit comprising a cooking chamber extending between a heated air source and a vent, the stove top unit comprising a heating surface, the stove top unit being releasably mountable (or mounted) on the oven unit such that (in use), when the stove top unit is mounted on the oven unit, heated air flowing from the heated air source flows through the vent and into the stove top unit, thereby heating the heating surface.

Accordingly, in use, heated air flowing from the heated air source inventively heats both the cooking chamber of the oven unit and the heating surface of the stove top unit when the stove top unit is mounted on the oven unit. The modular cooking apparatus therefore performs two functions using only one heated air source, and heated air (which would typically flow out of the vent and escape into the surroundings if the stove top unit were not mounted on the oven unit) is reused rather than wasted. Additionally, when the stove top unit is not mounted on the oven unit, the oven unit may be used individually as an oven, wherein heated air flows from the heated air source, through the cooking chamber, and out through the vent. By providing a stove top unit which is releasably mountable on the oven unit, the stove top unit and oven unit may be stored individually and only assembled together when required, which may be especially important for larger oven units and/or stove top units which may require a significant volume of storage space.

It may be that the modular cooking apparatus further comprises a removable flue, said removable flue being releasably mountable to the vent of the oven unit when the stove top unit is not mounted on the oven unit. The removable flue may therefore be mounted to the vent of the oven unit when the oven unit is to be used individually, independent of the stove top unit, as an oven, but the removable flue may also be removed from the vent such that the stove top unit can be mounted on the oven unit (over the vent) for use as a stove top.

The removable flue may comprise one or more flanges releasably engageable with a corresponding mounting surface of (or adjacent to) the vent. It may be that the one or more flanges are releasably mountable onto the corresponding mounting surface by way of one or more bolts. Alternatively, the removable flue may comprise a threaded end and the vent may comprise a correspondingly threaded bore, the threaded end being releasably retainable within the threaded bore.

It may be that the vent is provided on an upper (most) surface of the oven unit. It may be that the stove top unit is mountable (or mounted) on top of the oven unit (around the vent). Accordingly, it may be that the stove top unit is provided (vertically) above the cooking chamber of the oven unit when said stove top unit is mounted on top of the oven unit. A heated air flow path of heated air flowing from the heated air source may therefore be defined (sequentially) from the heated air source, through the cooking chamber, upwards through the vent into the stove top unit (towards the heating surface).

It may be that the stove top unit comprises an inlet configured to align with the vent when the stove top unit is mounted on the oven unit, thereby bringing an interior chamber of the stove top unit into gaseous communication with the cooking chamber of the oven unit. It may be the inlet has substantially the same shape and/or dimensions as the vent. It may be that the inlet is provided in a position on an underside of the stove top unit which corresponds with a position on an upper (most) surface of the oven unit at which the vent is provided, when the stove top unit is mounted on the oven unit.

It may be that the heating surface is provided on part of an upper (most) surface of the stove top unit. It may be that the heating surface forms part of the upper (most) surface of the stove top unit. The heating surface typically is typically provided on, or forms, a surface of the stove top unit easily accessible by a user when the stove top unit is mounted on the oven unit.

It may be that the heating surface is flat. For example, it may be that the heating surface is sufficiently flat such that crockery, pans or food items may be safely placed (e.g. stored) on the heating surface without (substantial) risk of said items rolling or sliding off the heating surface.

It may be that the stove top unit further comprises one or more heated air guides configured to guide heated air flowing from the vent into the stove top unit towards an underside of the heating surface. It may be that said one or more heated air guides comprise one or more baffles configured to direct (i.e. deflect) heated air flowing from the vent (through the inlet) into the stove top unit towards the underside of the heating surface. Said one or more heated air guides (e.g. said one or more baffles) typically increase flow of heated air towards the underside of the heating surface, thereby causing greater heating of the heating surface (i.e. raising the temperature of the heating surface).

It may be that one or more of the one or more heated air guides (e.g. one or more of the one or more baffles) is moveable between a directed position, in which heated air flowing from the vent into the stove top unit is directed towards a first area of the underside of the heating surface, and a diffuse position, in which heated air is directed towards a second area of the underside of the heating surface, said second area being greater than said first area. For example, when the one or more of the one or more heated air guides (e.g. baffles) are provided in the directed position, the first area of the underside of the heating surface is heated sufficiently such that said first area may be used to direct heat towards pots or pans placed on the heating surface, i.e. for cooking purposes. When the one or more of the one or more heated air guides (e.g. baffles) are provided in the diffuse position, the second area of the underside of the heating surface is heated to a lower temperature than the temperature of the first area of the heated surface (when the one or more of the one or more heated air guides are provided in the directed position), said lower temperature being such that said second area may be used to warm crockery or food items, i.e. for warming purposes rather than cooking purposes.

It may be that the stove top unit further comprises a flue. It may be that the stove top unit flue and the oven unit flue have (substantially) similar dimensions. It may be that the stove top unit flue and the oven unit flue have (substantially) similar shapes. It may be that the stove top unit flue and the oven unit flue have (substantially) similar cross sections.

It may be that the stove top unit comprises a vent. It may be that said stove top unit vent and the oven unit vent have (substantially) similar dimensions. It may be that said stove top unit vent and the oven unit vent have (substantially) similar shapes.

It may be that the stove top unit flue is releasably mountable on the stove top unit vent. It may be that the stove top unit flue is releasably mountable on the oven unit vent when the stove unit is not mounted on said oven unit. It may be that the oven unit flue is releasably mountable on the stove top unit vent. Accordingly, it may be that the modular cooking apparatus comprises the oven unit, the stove top unit and a single flue, the single flue being releasably mountable on the vent of the oven unit when the stove top unit is not mounted on the oven unit, said same single flue also being releasably mountable on the vent of the stove top unit. In use for example, a user may be provided with the oven unit with the single flue mounted on the vent thereof, and the separate stove top unit, said user then assembling the modular cooking apparatus by removing the single flue from the oven unit, mounting the stove top unit on the oven unit, and then mounting the single flue to the vent of the stove top unit.

It may be that the oven unit comprises (i.e. is) (configured as) a portable oven. For example, the oven unit may be smaller and/or lighter than a conventional oven such that the oven unit may be moved easily by a user. It may be that the oven unit is provided with legs, feet, castors, rollers, wheels and/or an oven stand such that the oven unit may be safely positioned on the floor or on the ground outside during use. It may be that that a (external) housing of the oven unit is (thermally) insulated such that a user may safely handle one or more external portions of the oven during use.

It may be that the oven unit comprises (e.g. is) a pizza oven. It may be that the cooking chamber is configured for cooking one or more pizzas. It may be that the cooking chamber is dimensioned and sized for cooking one or more pizzas. A cooking chamber configured for cooking one or more pizzas typically has a (interior) length and/or a (interior) breadth (substantially) greater than a (interior) vertical height of the cooking chamber.

It may be that the heated air source comprises a fuel burner. The fuel burner may be configured to burn one or more of the following combustible fuels: wood chips, wood pellets, coal, split wood, twigs, gas, oil. Alternatively, the heated air source may be an electrical heated air source comprising an electric heating element.

A third aspect of the invention provides cooking apparatus comprising an oven, the oven comprising a cooking chamber extending between a removable burner unit and a flue, the removable burner unit being releasably mountable (or mounted) to the oven and configured to receive combustible fuel.

The removable burner unit is releasably mountable to the oven such that the removable burner unit may be removed from the oven, thereby facilitating replacement of the burner unit, replacement of fuel, cleaning of the burner unit, cleaning of the cooking chamber of the oven, and/or safe storage of the removable burner unit separate from the oven.

Removal of the removable burner unit also typically reduces the size (i.e. the external dimensions) of the oven, thereby permitting easier storage.

When the removable burner unit is mounted to the oven and is loaded with combustible fuel, said combustible fuel being ignited, heated air flowing from the removable burner unit typically flows towards the flue, thereby heating the cooking chamber. Said heated air typically flows through the cooking chamber as it flows from the removable burner unit towards the flue. The cooking apparatus is therefore substantially different from conventional ovens comprising removable heated air sources, such as rocket stoves, in that heated air (and combustion products) flowing from the removable burner unit directly heats the (interior of the) cooking chamber (and therefore any food items provided within said cooking chamber for cooking) in the present invention. In conventional ovens comprising removable heated air sources, such as rocket stoves, the cooking chamber is typically heated by heated air flowing from the heated source around at least a portion of the exterior of the cooking chamber. In such conventional ovens comprising removable heated air sources, the heated air (and thus also combustion products) do not come into direct contact with an interior of the cooking chamber (and/or the food items provided within said cooking chamber for cooking). In the present invention, by providing a heated air flow path from the removable burner unit towards the flue through the cooking chamber, the temperature of the cooking chamber is significantly increased in comparison to conventional ovens. The cooking apparatus is therefore suited for the cooking of baked goods, and in particular breads and pizzas, which typically require high cooking temperatures for a satisfactory cooking result. Additionally, since combustion products typically flow through the cooking chamber and come into direct content with cooking food items, said food items are typically provided with the smoky and/or charred flavour characteristic of a wood-fired pizza oven, which is neither achievable nor desired in conventional ovens comprising removable heated air sources, such as rocket stoves.

It may be that the removable burner unit comprises one or more air vents configured to permit air to flow from outside the removable burner unit (e.g. outside the oven, i.e. the surrounding atmosphere) into the removable burner unit, thereby facilitating combustion of combustible fuel within the removable burner unit, when said removable burner unit is mounted to the oven and is loaded with combustible fuel, said combustible fuel being ignited. Provision of said one or more air vents therefore typically allows for more complete combustion of the fuel, attainment of higher cooking temperatures within the cooking chamber, and less fuel wastage.

It may be that one or more of the one or more air vents is adjustable to thereby control a flow of air into the removable burner unit. By controlling the flow of air into the removable burner unit by adjusting one or more of the one or more air vents, the temperature in the cooking chamber may also be controlled. Additionally, by closing each of the one or more air vents, combustion may be stopped or prevented.

It may be that the oven is (configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that a (external) housing of the oven is (thermally) insulated such that a user may safely handle one or more external portions of the oven during use.

It may be that the oven is a pizza oven. It may be that the cooking chamber is configured for cooking one or more pizzas. It may be that the cooking chamber is dimensioned and sized for cooking one or more pizzas. A cooking chamber configured for cooking one or more pizzas typically has a (interior) length and/or a (interior) breadth (substantially) greater than a (interior) vertical height of the cooking chamber.

It may be that the removable burner unit is configured to burn one or more of the following combustible fuels: wood chips, wood pellets, coal, split wood, twigs, gas, oil.

A fourth aspect of the invention provides modular cooking apparatus comprising an oven unit and a stove top unit, the oven unit comprising an oven, the oven comprising a cooking chamber, a removable burner unit, a vent, and a baffle, the cooking chamber extending between the removable burner unit and the vent, thereby defining, in use, a heated air flow path between said removable burner unit and said vent, the removable burner unit being releasably mountable to the oven and configured to receive combustible fuel, said combustible fuel being ignitable within the removable burner unit so as to function as a heated air source, the baffle being reversibly deployable in the heated air flow path to deflect heated air (within the cooking chamber) (thereby causing recirculation of heated air within the cooking chamber), the stove top unit comprising a heating surface, the stove top unit being releasably mountable on the oven unit such that, when the stove top unit is mounted on the oven unit, heated air flowing from the removable burner unit flows through the vent and into the stove top unit, thereby heating the heating surface.

A fifth aspect of the invention provides a kit of parts comprising; a (portable) oven comprising a cooking chamber extending between a rear aperture and a front aperture, and a vent; a burner unit configured to receive combustible fuel; a flue configured to be releasably mountable on the vent; and a baffle configured to be removably mountable within the cooking chamber of the oven adjacent to the vent. The rear aperture is typically configured to releasably retain at least a portion of the burner unit, said at least a portion of the burner unit typically extending into the cooking chamber when retained by the rear aperture. The front aperture is typically configured to provide a user access to the cooking chamber during use. The kit of parts may further comprise an oven door removably or hingedly mountable on said front aperture (i.e. to close said front aperture). The baffle may be fixedly attached to or integrally formed with the oven door.

Optional features of any one aspect of the invention are also, mutatis mutandis, optional features of any other aspect of the invention.

DESCRIPTION OF THE DRAWINGS

An example embodiment of the present invention will now be illustrated with reference to the following Figures in which:

FIG. 13 is a sectional view of an alternative portable pizza oven;

FIG. 14 is a perspective view of the oven door with integral baffle of the portable pizza oven of FIG. 13;

FIG. 15 is an additional perspective view of the oven door of FIG. 14;

FIG. 16 is a sectional view of a further alternative portable pizza oven;

FIG. 17 is a perspective view of the oven door with integral flue extender of the portable pizza oven of FIG. 16;

FIG. 18 is an additional perspective view of the oven door of FIG. 17;

DETAILED DESCRIPTION OF AN EXAMPLE EMBODIMENT

Figure 1:
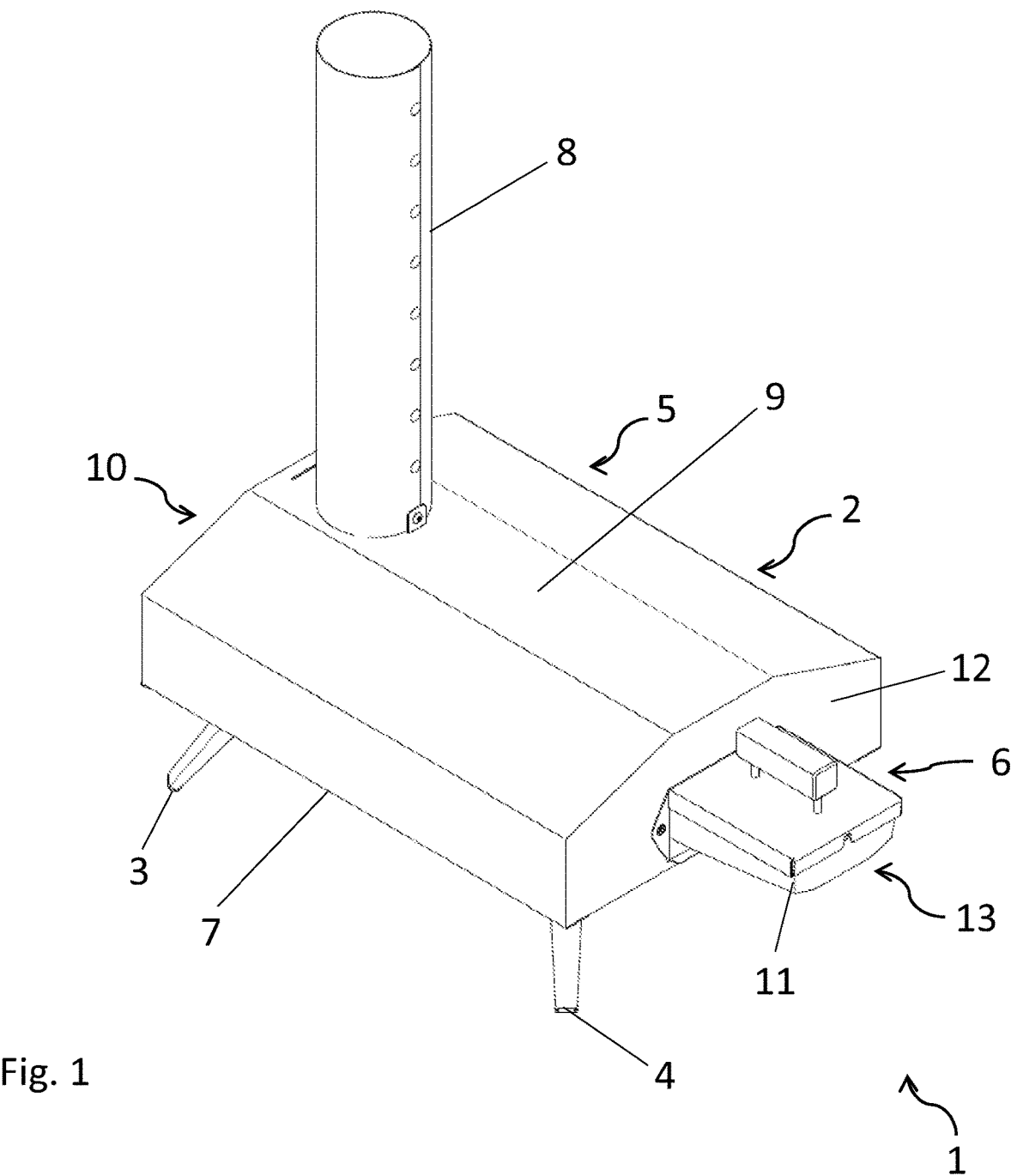
FIG. 1 is a perspective view of a portable pizza oven.
Figures 2, 3:
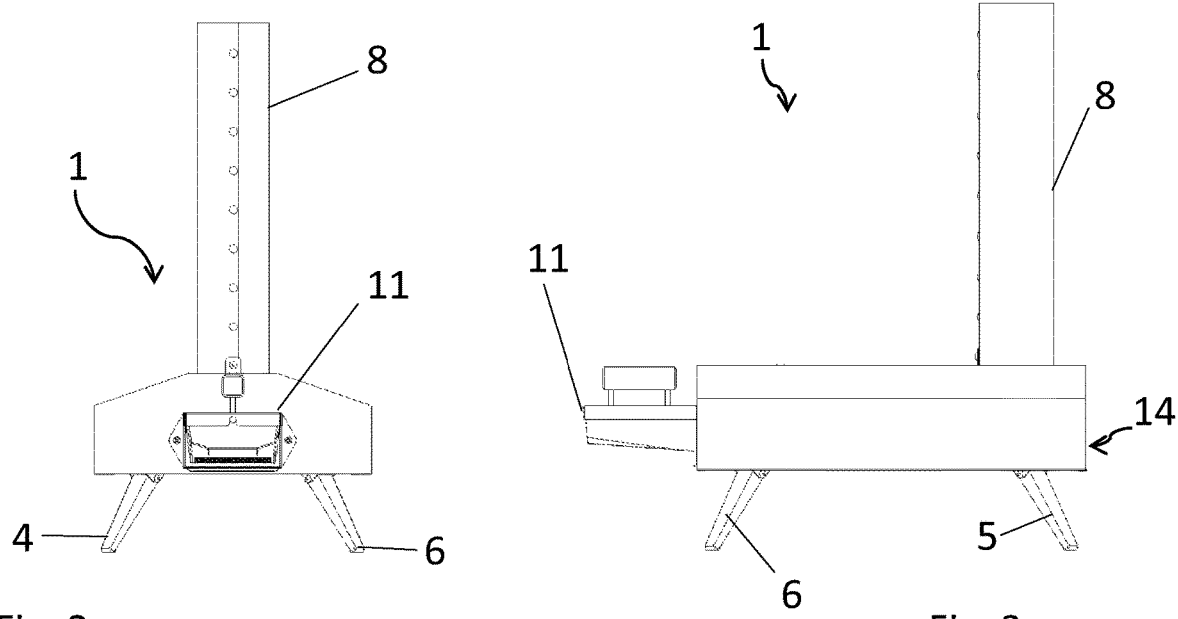
FIG. 2 is a rear view of the portable pizza oven of FIG. 1.
FIG. 3 is a side view of the portable pizza oven of FIG. 1.
Figure 4:
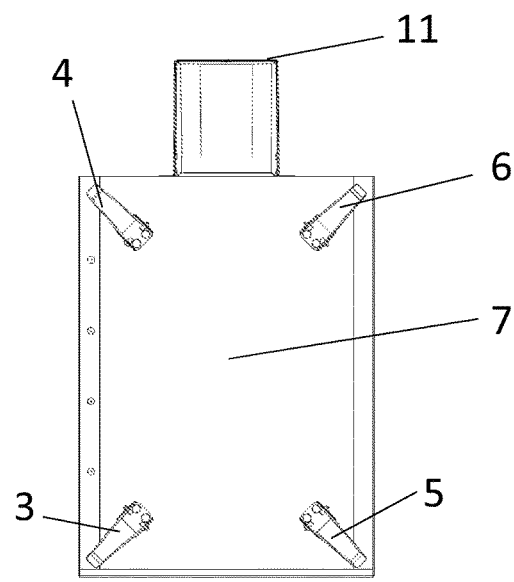
FIG. 4 is a view from below of the portable pizza oven of FIG. 1.

As shown in FIGS. 1, 2, 3 and 4, a portable pizza oven 1 comprises a pizza oven body 2 supported on top of four legs 3, 4, 5, 6 which extend from a base 7 of the body 2. A flue 8 extends from a top surface 9 of the body at a front end 10, and a removable burner 11 extends from a rear wall 12 of the body at a rear end 13. An opening 14 for receiving pizzas is provided at the front end 10 of the body. The oven body 2, flue 8, legs 3, 4, 5, 6 and burner 11 are constructed principally from stainless steel.

Figure 5:
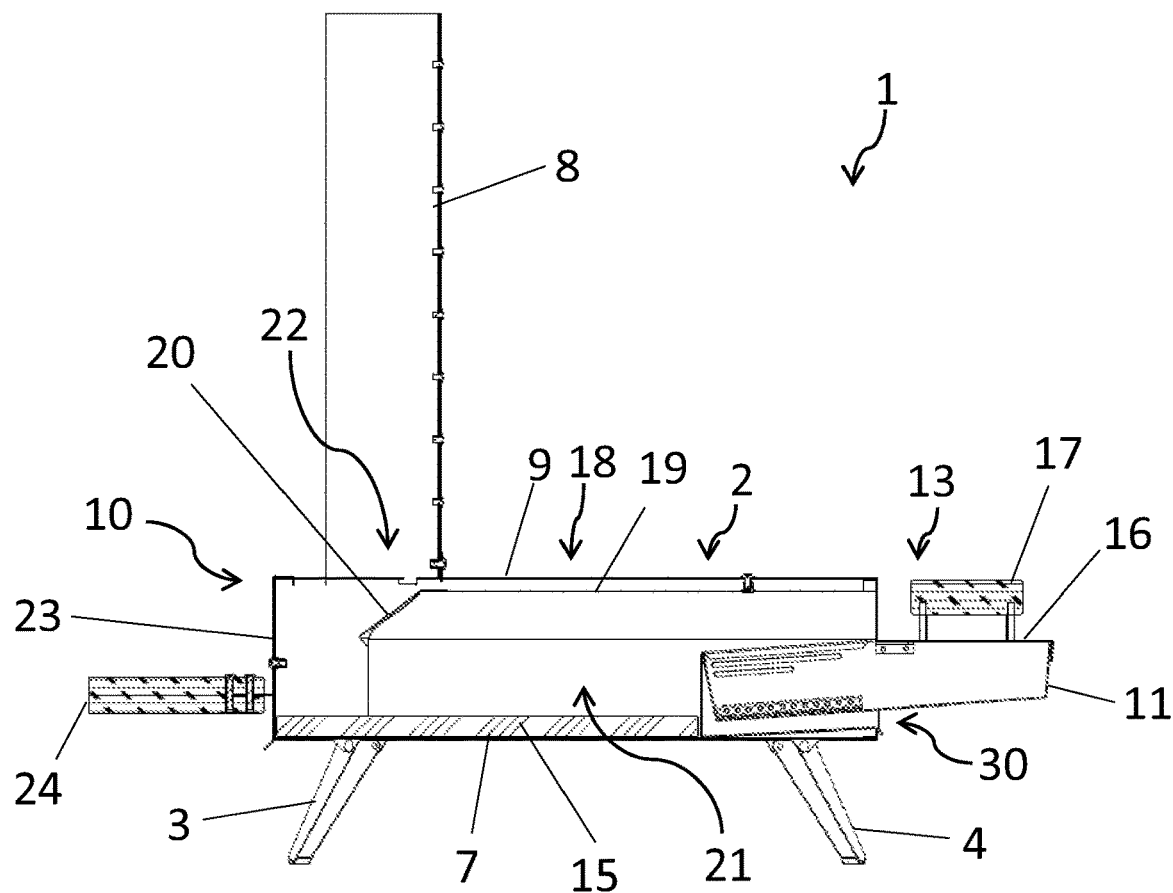
FIG. 5 is a sectional view of the portable pizza oven of FIG. 1.

The interior structure of the oven is illustrated in FIG. 5. A pizza cooking surface 15 made of aluminium is provided within the oven body 2 above the base 7, extending from the front end 10 approximately three quarters of the way towards the rear end 13 of the oven where the burner 11 is releasably retained. The burner 11 has an open roof which brings the interior of the burner 11 into gaseous communication with the interior of the oven body 2, and a slidable lid 16 with a handle 17 releasable retained on a rear portion of the burner. An insulating air gap 18 is provided between the top surface of the oven body 9 and a cooking chamber ceiling 19. The cooking chamber ceiling 19 is fixedly attached to the oven body 2 at the rear and sides of the oven, but the air gap 18 is open towards the front end 10. A removable baffle 20 is releasably mounted to the cooking chamber ceiling 19 at the front end, said removable baffle 20 depending from the ceiling 19 into the cooking chamber 21 in front of the flue 8. The flue 8 is releasably attached to the top surface 9 of the oven body 2 around a vent 22 such that the interior of the flue 8 and the interior of the oven body 2 are in gaseous communication. A removable door 23 with a handle 24 is provided at the front end 10 of the body, closing the opening 14. The cooking chamber ceiling 19, cooking surface 15 and side walls of the oven body 2 together define the cooking chamber 21.

Figure 6:
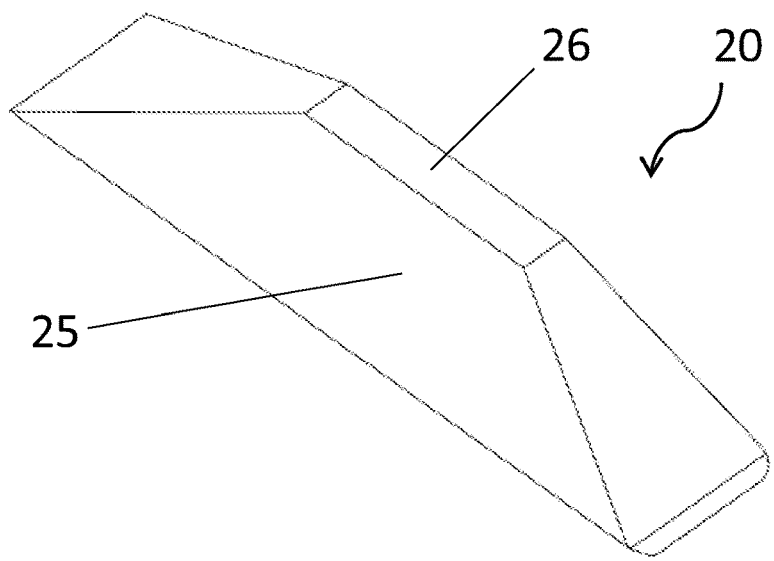
FIG. 6 is a perspective view of a removable baffle from within the portable pizza oven of FIG. 1.
Figure 7:
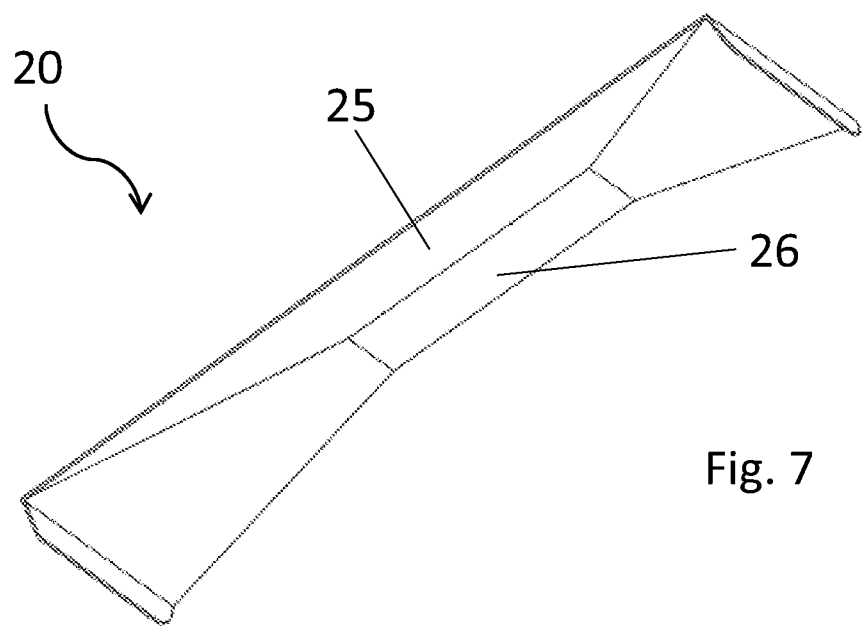
FIG. 7 is an additional perspective view of the removable baffle of FIG. 6.

The removable baffle 20, as shown in FIGS. 6 and 7, comprises an elongate baffle wall 25 which extends generally downwards from a mounting surface 26 divided into three substantially flat portions. The mounting surface 26 is shaped to conform with the three-dimensional shape of the cooking chamber ceiling 19 and the top surface of the oven body 9 so as to be releasably mountable within the space 18 therebetween.

Figure 8:
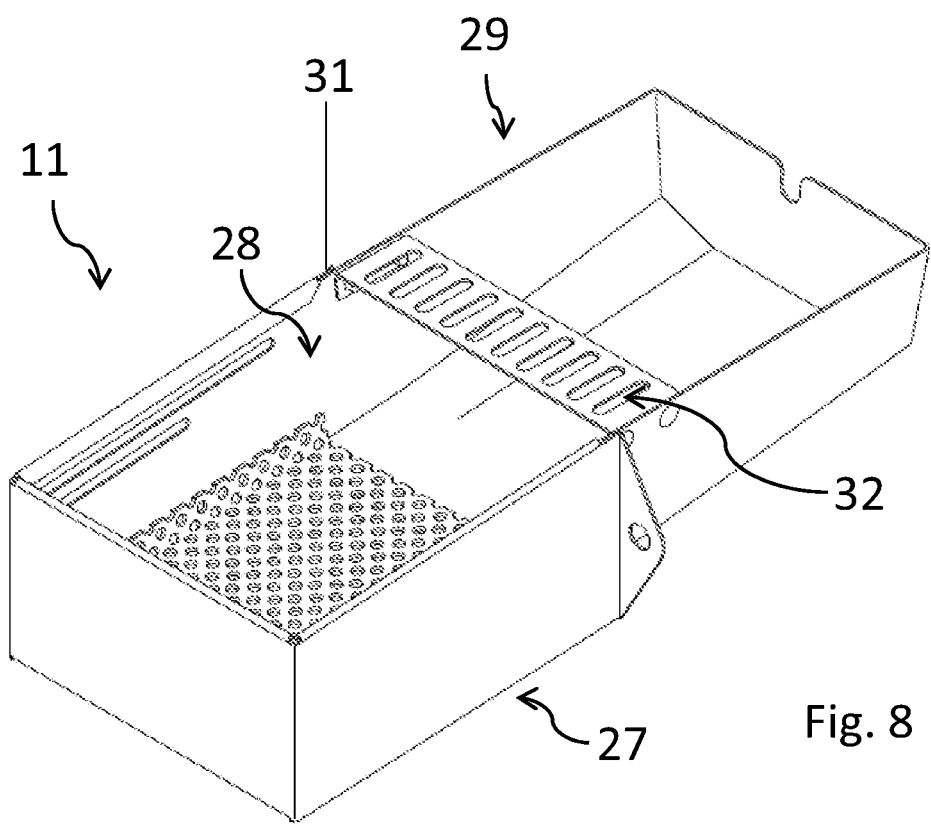
FIG. 8 is a perspective view of a burner unit from the portable pizza oven of FIG. 1.
Figure 9:
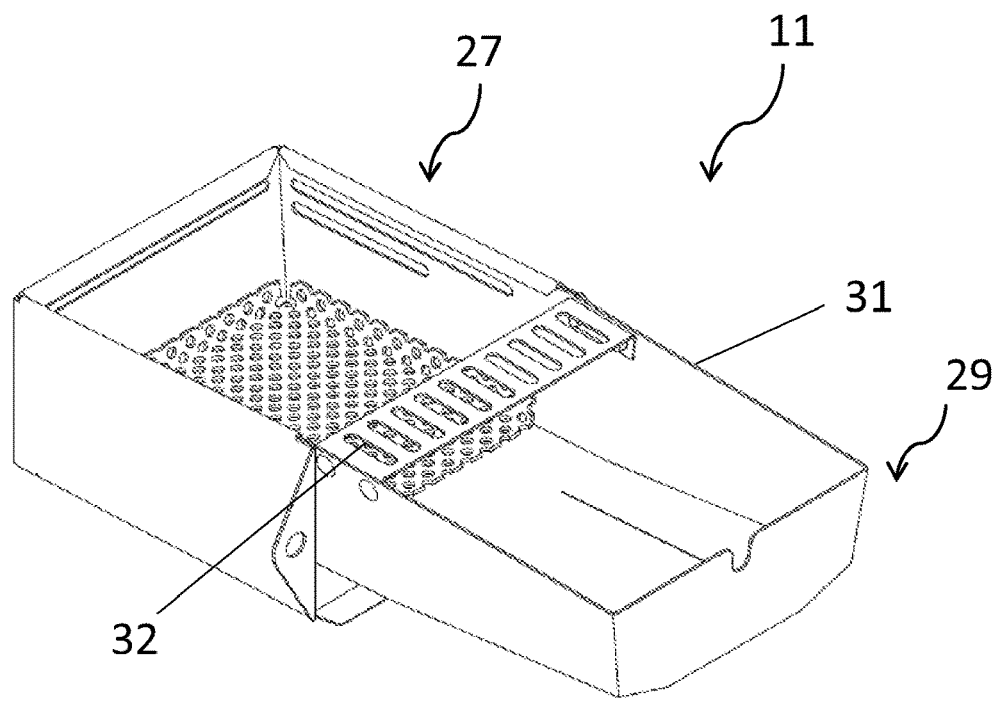
FIG. 9 is an additional perspective view of the burner unit of FIG. 8.
Figure 10:
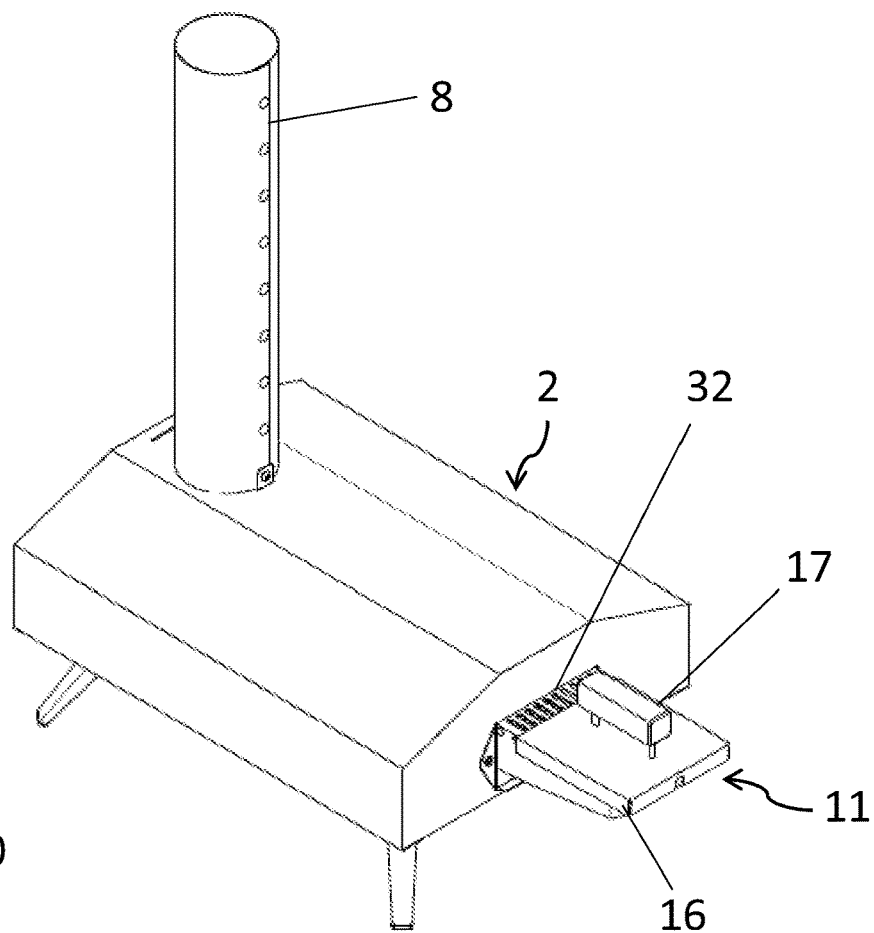
FIG. 10 is a perspective view of the portable pizza oven of FIG. 1 when a lid of the burner unit has been opened to reveal air vents.

The removable burner 11, as shown in more detail in FIGS. 8 and 9, comprises a generally cuboidal front burner portion 27 with an open roof 28 and a rear fuel loading portion 29. The front burner portion 27 is shaped and dimensioned so as to be slidably receivable within a rear burner opening 30 of the oven body 2. A vent wall 31 comprising a plurality of air vents 32 is provided across the open roof of the burner 11 between the front burner portion 27 and the rear fuel loading portion 29. The base of the rear fuel loading portion 29 is sloped generally downwards from the rear of the rear fuel loading portion 29 towards the front burner portion 27 such that fuel loaded into the rear fuel loading portion 29 tends to slide down into the front burner portion 27. As shown in FIGS. 1 and 10, a user may manually slide the slidable lid 16 onto and along the rear portion of the open roof of the burner 11 by way of the handle 17, to thereby provide access to the rear fuel loading portion 29 for the provision of burner fuel, or to expose or cover the air vents 32 during use.

Figure 11:
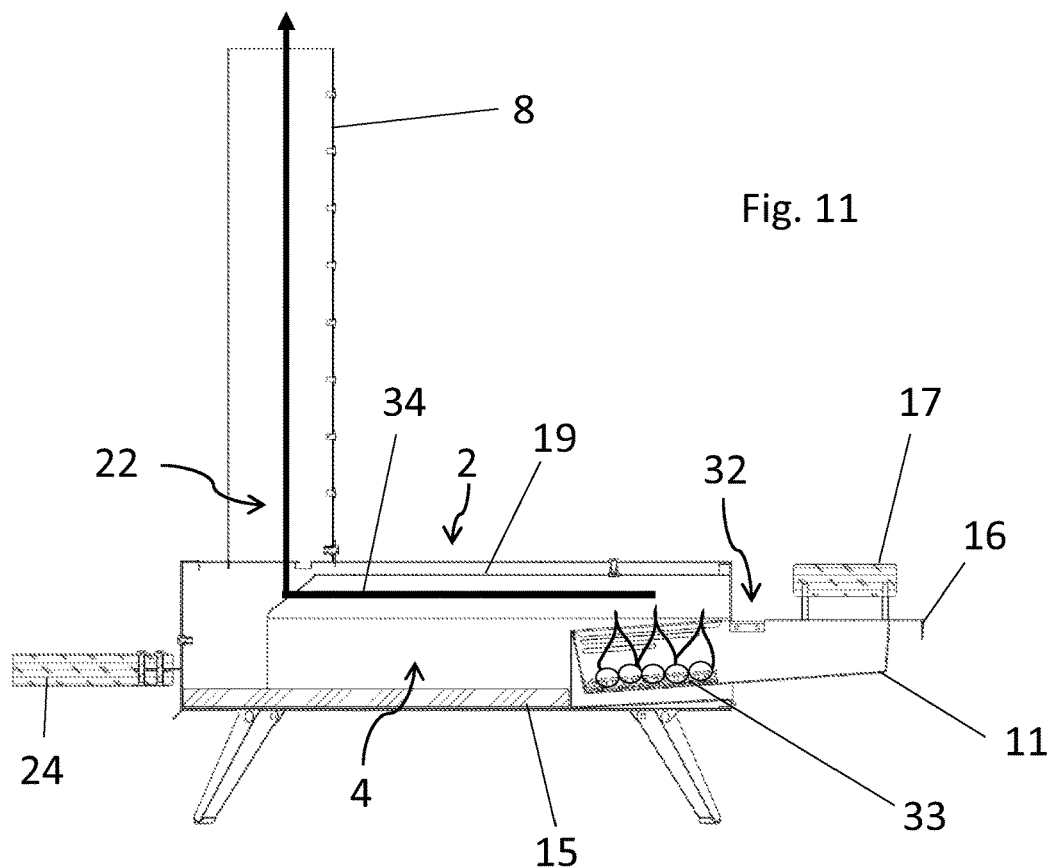
FIG. 11 illustrates the flow path of heated air through the portable pizza oven of FIG. 1 when the removable baffle has been removed.
Figure 12:
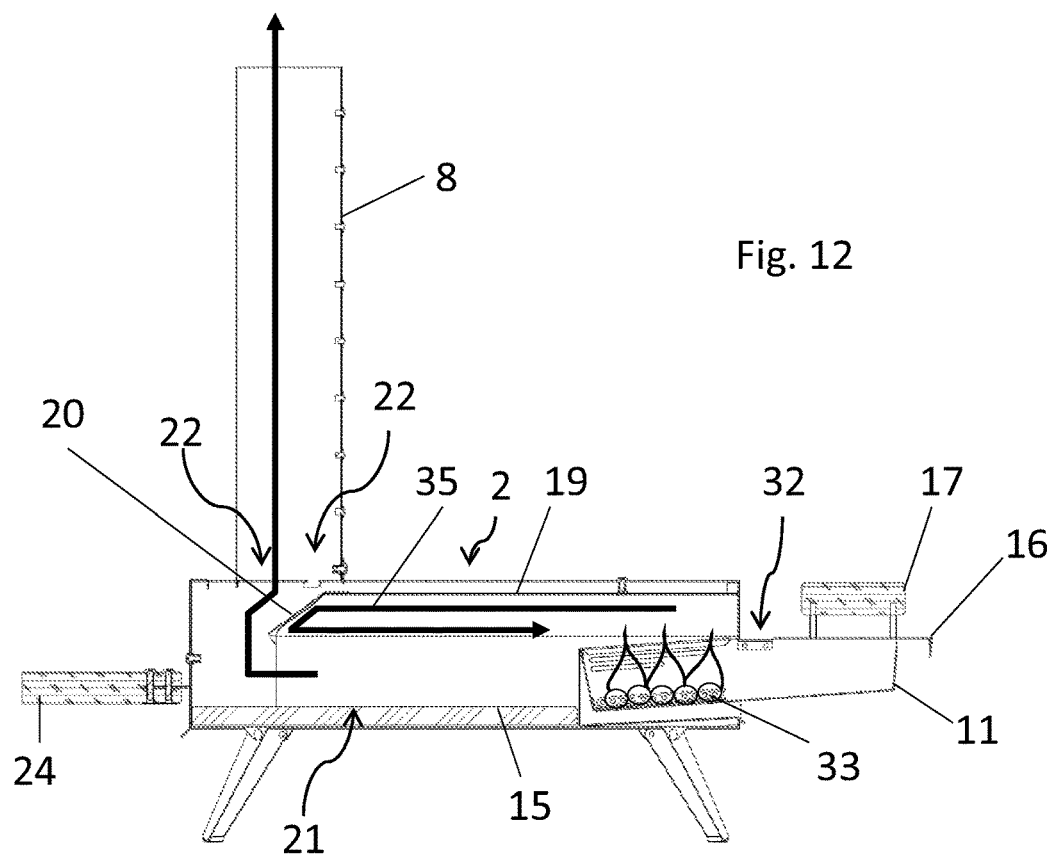
FIG. 12 illustrates the flow path of heated air through the portable pizza oven of FIG. 1 with the removable baffle in place.

The typical operation of the pizza oven without the removable baffle, and with the removable baffle in place, is illustrated in FIGS. 11 and 12 respectively. In both cases, a user loads combustible fuel 33 (such as wood chips or twigs) into the burner 11 by first sliding back the slidable lid 16 to expose the open roof of the rear fuel loading portion 29 of said burner. The combustible fuel 33 is ignited within the burner 11 and combustion of the fuel heats the air directly above the open roof of the front portion of the burner within the oven body 2. Heated air (and combustion products) flow from above the burner 11 into the cooking chamber 21 of the oven. As heated air is less dense than cool air, the heated air tends to flow through the cooking chamber 12 immediately below the cooking chamber ceiling 19 along flow path 34.

When the removable baffle is not mounted within the oven, as shown in FIG. 11, heated air which approaches the front of the cooking chamber 21 tends to flow vertically upwards through the vent 22, into the flue 8, and escapes into the surrounding atmosphere. Air heated by combustion of fuel 33 in the burner 11 therefore spends a relatively short period of time within the cooking chamber 21.

Additionally, only a small proportion of the heated air flows towards the base 15 of the cooking chamber. Any food which is placed on top of the cooking surface 15 (such as a pizza) reaches a relatively low maximum temperature. When the oven is used to cook pizzas, this means that an optimum pizza cooking temperature may not be achieved, resulting in an inadequately cooked pizza.

However, when the removable baffle 20 is correctly mounted within the oven, as shown in FIG. 12, heated air which approaches the front of the cooking chamber 21 immediately below the cooking chamber ceiling 19 is deflected both vertically downwards and horizontally backwards towards the rear of the cooking chamber 19 according to flow path 35. Heated air therefore tends to recirculate within the cooking chamber 19, and particularly within an upper portion of the cooking chamber 19, for a significant period of time before the air cools sufficiently to fall below the lowest height of the baffle wall and escape underneath the baffle, up through the vent and out through the flue into the surroundings according to flow path 36. As the heated air circulates within the cooking chamber 19, the average temperature of the cooking chamber is raised. Any food which is placed on top of the cooking surface 15 (such as a pizza) reaches a higher maximum temperature than when the removable baffle is not provided. When the oven is used to cook pizzas, it is more likely that an optimum pizza cooking temperature is achieved, resulting in a higher quality pizza.

If the oven is to be used to cook a food item having a greater (vertical) height profile than a pizza, such as a cake, the removable baffle 20 can be removed from the oven, thereby permitting sliding of the larger object into the oven through the front opening 14 without interference from the baffle 20. Optionally, the removable baffle 20 may be remounted within the oven after the larger object has been placed in the cooking chamber 19, if a higher cooking temperature is also required. The removable baffle 20 therefore permits the cooking of food items of different sizes and at different temperatures without having to provide a directly controllable temperature control. This portable pizza oven 1 is therefore more versatile as well as more effective as a pizza oven.

A first alternative configuration of the removable baffle is illustrated in FIGS. 13, 14 and 15. Baffle 36 is fixedly attached to oven door 37 by three support struts 38, 39, 40. The oven door 37 is provided with a thermally insulated handle 41. When the oven door is not used to close the front opening 14 of the oven body, the oven functions essentially as outlined with regard to FIG. 11, and air heated by combustion of fuel within the burner 11 is able to flow through the cooking chamber 21 and out of the flue 8 without recirculating within said chamber. The average temperature of the oven is, in that case, relatively lower. When front opening 14 of the oven body is closed by the door 37, the baffle 36 extends from the door into the cooking chamber 21 and rests on the ceiling 19 of the cooking chamber, such that the oven functions essentially as outlined with regard to FIG. 12. Heated air therefore, in that case, circulates within the oven due to deflection by the baffle 36, and the average cooking temperature of the oven is relatively higher. A particular benefit of providing the baffle 36 fixedly attached to the oven door 37 is that a separate tool is not required to remove and replace the (hot) removable baffle during use.

A second alternative configuration of the removable baffle is illustrated in FIGS. 16, 17 and 18. A vertical flue extender 42 is fixedly attached to oven door 43 by support panel 44. The oven door 43 is provided with a thermally insulated handle 45. When the oven door 43 is not used to close the front opening 14 of the oven body, the oven again functions essentially as outlined with regard to FIG. 11, and air heated by combustion of fuel within the burner 11 is able to flow through the cooking chamber 21 and out of the flue 8 without recirculating within said chamber. The average temperature of the oven is, in that case, relatively lower. When front opening 14 of the oven body is closed by the door 43, the vertical flue extender 42 projects from the door into the cooking chamber 21 beneath the flue 8, forming a vertical channel beneath the flue 8, effectively functioning to lower the position of the vent 22 at which air flows into the flue. The front and side walls of the flue extender 42 together function as a baffle, deflecting heated air flow from the burner 11 back into the cooking chamber 21, such that the oven again functions essentially as outlined with regard to FIG. 12. Heated air therefore, in that case, circulates within the oven due to deflection by the baffle walls of the flue extender 42, and the average cooking temperature of the oven is relatively higher. Again, this configuration means that a separate tool is not required to remove and replace the removable baffle during use. Additionally, as the baffle walls of the flue extender 42 extend around the entrance to the flue 8, the flue extender 42 effectively deflects more heated air away from the flue, allowing even higher air recirculation times, and thus higher temperatures, to be achieved within the cooking chamber.

Figure 19:
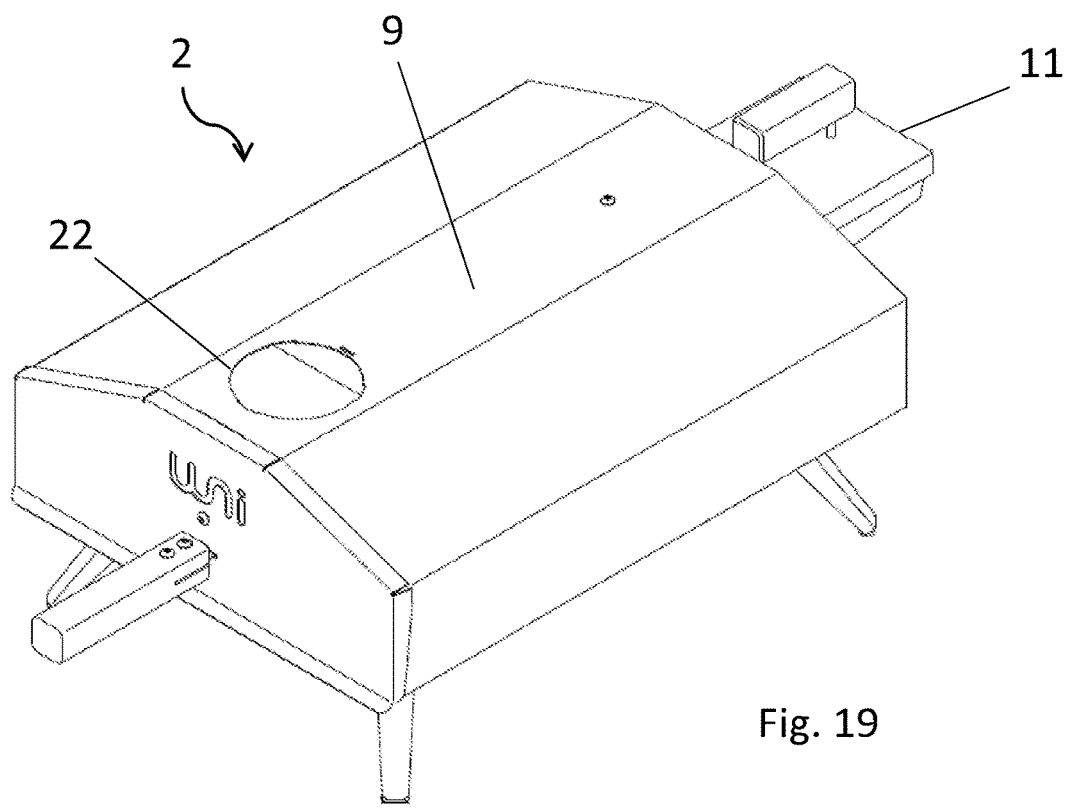
FIG. 19 is a perspective view of the portable pizza oven of FIG. 1 after the flue has been removed.
Figure 20:
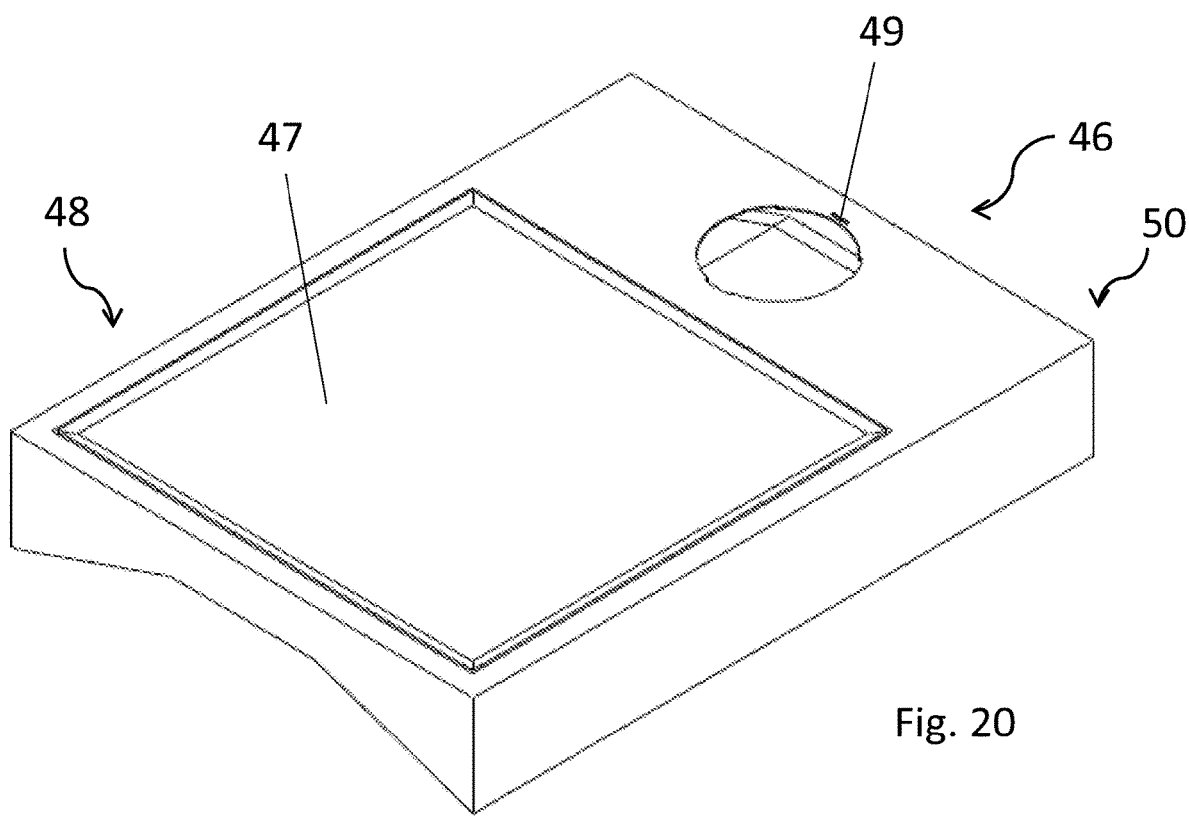
FIG. 20 is a perspective view of a hot plate module.
Figure 21:
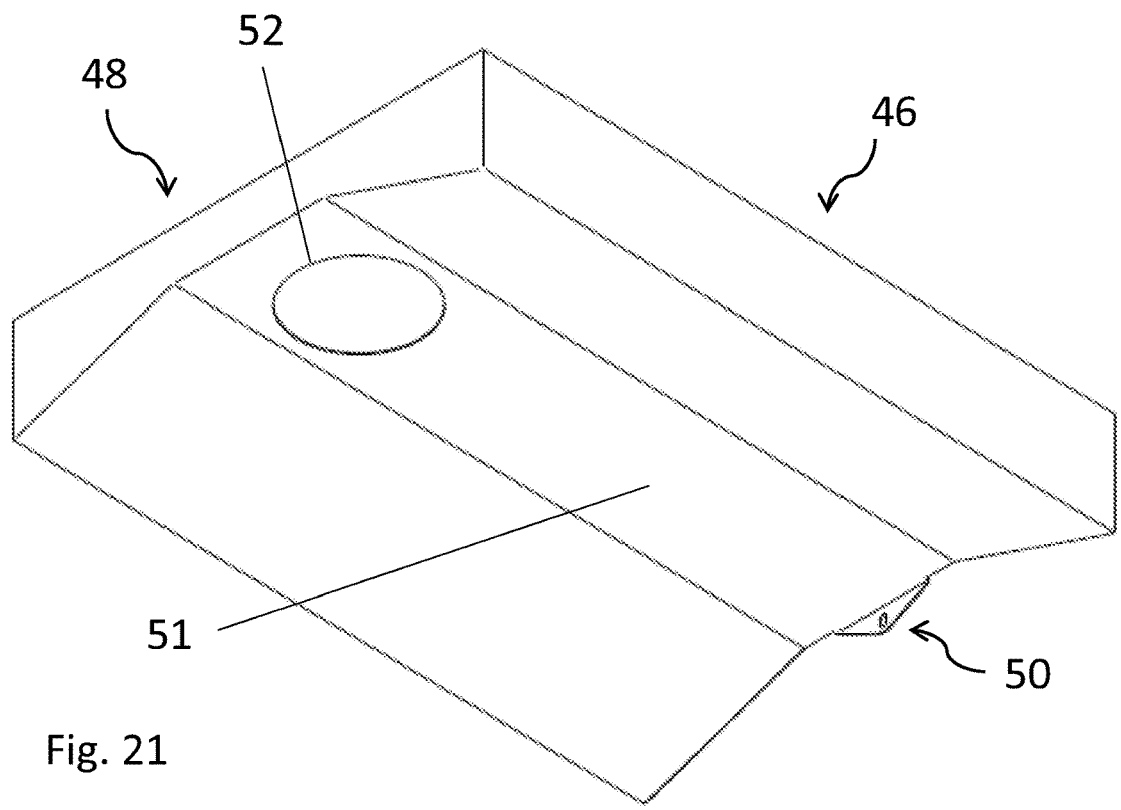
FIG. 21 is an additional perspective view of the hot plate module of FIG. 20.
Figure 22:
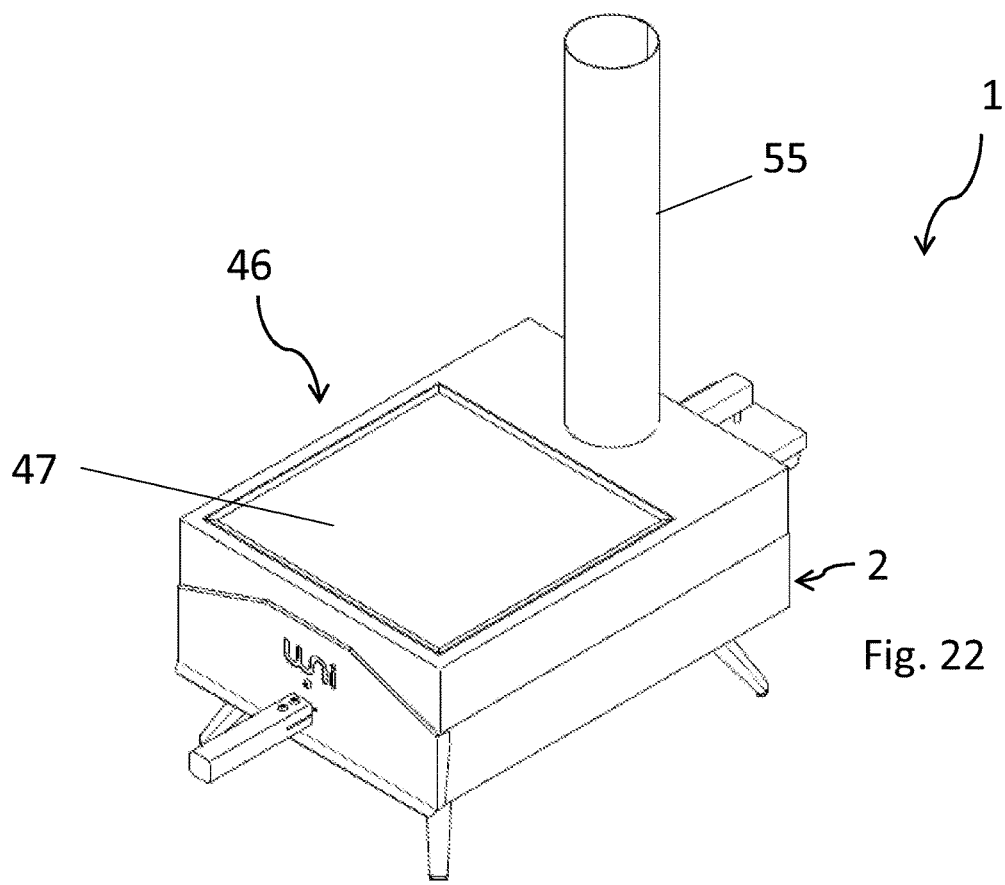
FIG. 22 is a perspective view of the hot plate module of FIGS. 20 and 21 mounted on top of the portable pizza oven of FIG. 19 with a flue attached.

As illustrated in FIG. 19, the flue 8 is detachable from the top 9 of the oven body 2 so as to expose the circular vent 22 and bring the interior of the cooking chamber 21 into gaseous communication with the surroundings. In use, the flue 8 is typically detached in order to mount additional cooking modules to the oven body, such as the hot plate module 46 shown in FIGS. 20 and 21. A top side of the hot plate module includes a substantially rectangular heating plate 47 provided at a heating end of the module 48 and a circular vent 49 provided at a vent end 50 of the module. An underside 51 of the hot plate module is shaped to be cooperatively mountable onto the top surface 9 of the oven body 2, when the flue 8 is detached, and also comprises a circular vent 52 provided at the heating end 48 of the module. In use, the hot plate module 46 is mounted on top of the oven such that the heating plate 48 end is positioned above the oven vent 22, the vent 52 on the underside of the hot plate module aligning with the oven vent, and the vent end 50 is positioned vertically above the rear of the oven. Such an arrangement brings an interior chamber 53 of the hot plate module into gaseous communication with the cooking chamber 21 of the oven.

Figure 23:
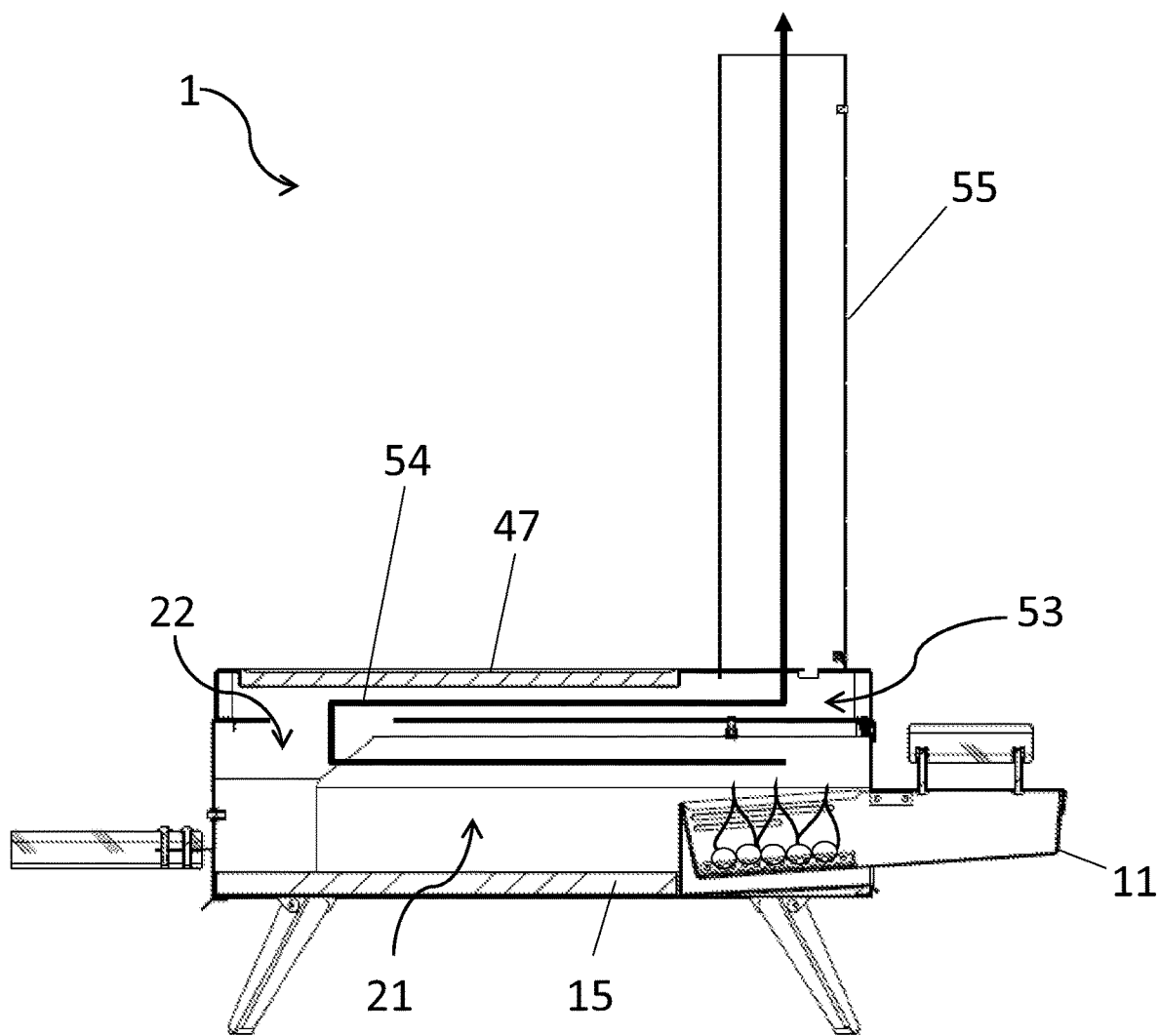
FIG. 23 illustrates the flow path of heated air through the portable pizza oven and through the hot plate module of FIG. 22.

The flow path 54 of heated air generated by the burner 11 through the oven 2 and through the hot plate module 46 is illustrated in FIG. 23. Heated air (and combustion products) flows sequentially from above the burner 11 into and through the cooking chamber 21 immediately below the cooking chamber ceiling 19 towards the oven vent 22, through the oven vent 22 and the aligned vent 52 provided on the underside of the hot plate module 46, into and through the hot plate chamber 53, and then out through the hot plate flue 55 releasably mounted onto the hot plate module around the vent 49. Heated air generated by the burner 11 therefore heats both the cooking chamber 21 of the oven and the interior chamber 53 of the hot plate module. The heating plate 47 is made of thermally conductive materials such that the heated air flowing through the interior chamber 53 heats the heating plate 47. The heating plate 47 may therefore be used to warm plates or food (such as bread), or when the temperature is sufficiently high enough, the heating plate 47 may also be used for cooking purposes, essentially functioning as a cook top or hob. The oven 2 combined with the hot plate module 46 therefore provides a dual cooking function from one single burner 11. Both the oven 2 and the hot plate 46 may be operated simultaneously.

One skilled in the art will appreciate that alternative shapes of the removable baffle are possible. For example, the baffle may comprise a single flat wall which depends vertically from the ceiling of the oven cooking chamber. Alternatively, the baffle may have a complex three-dimensional shape configured to cause specific heated air recirculation paths within the cooking chamber.

The baffle may be a movable baffle. For example, the baffle may be hingedly attached to the ceiling of the cooking chamber such that the baffle is rotatable between a deployed position in which the baffle causes recirculation of heated air within the cooking chamber and a retracted position in heated air flows relatively undeflected from the burner to the flue. The baffle may be a collapsible baffle or a foldable baffle. The baffle may form a continuous barrier across the width of the cooking chamber. Alternatively, the baffle may form a partial barrier across the width of the cooking chamber. The baffle may have one or more perforations. The baffle may comprise a window or may be formed from a transparent material so as to allow a user to observe the interior of the cooking chamber during cooking.

While the oven is typically an oven for cooking pizzas (i.e. the size and shape of the cooking chamber is configured for cooking one or more pizzas), the oven may alternatively be configured for cooking other foodstuffs, including baked goods, roasted vegetables, casseroles, meat and fish, among others.

The pizza cooking surface may be made of any suitable material, including aluminium, cast iron, stainless steel, stone (such as cordierite) or a ceramic material.

The oven body may be provided on legs, feet, castors, wheels or any other form of support. Alternatively, the oven body may rest directly on a (thermally insulating) work surface.

The burner may be configured to burn any forms of combustible fuel including, but not limited to, coal, coke, charcoal, wood, twigs, wood chips, oil or gas. Alternatively, the burner may comprise an electric heater.

The underside of the hot plate module, or an underside of the heating surface of the hot plate module, may be provided with one or more baffles or heated air directors configured to direct heated air towards specific areas of the heating surface to create hot spots. Said baffles or heated air directors may be moveable between one or more directed positions and one or more diffuse positions, so that the areas of the heating surface which are heated by the heatable air may be controlled.

Further modifications and variations may be made within the scope of the invention herein disclosed.

The invention claimed is:

1. Cooking apparatus comprising an oven, the oven comprising a cooking chamber, a heated air source, a flue, and a baffle, the cooking chamber extending between the heated air source and the flue, thereby defining, in use, a heated air flow path between said heated air source and said flue, the baffle being reversibly deployable in said heated air flow path to deflect a portion of the heated air away from the flue, wherein deflection of heated air flowing from the heated air source towards the flue by the baffle causes recirculation of heated air within an upper portion of the cooking chamber.

2. The cooking apparatus according to claim 1, wherein the baffle is reversibly deployable in a deflecting configuration in said heated air flow path in which the baffle is configured to deflect heated air.

3. The cooking apparatus according to claim 1, wherein the baffle is reversibly deployable in a deflecting position in said heated air flow path in which the baffle deflects heated air.

4. The cooking apparatus according to claim 3, wherein the baffle is moveable between the deflecting position and an air flow position in which deflection of heated air by the baffle is reduced.

5. The cooking apparatus according to claim 4, wherein the baffle is retracted from the heated air flow path when in the air flow position.

6. The cooking apparatus according to claim 1, wherein the baffle depends from a ceiling of the cooking chamber when the baffle is deployed in the heated air flow path.

7. The cooking apparatus according to claim 1, wherein the oven further comprises an oven door moveable between a closed position in which the cooking chamber is sealed from an external atmosphere and an open position in which the cooking chamber is externally accessible, and wherein movement of the oven door from the open position to the closed position causes corresponding reversible deployment of the baffle into the heated air flow path.

8. The cooking apparatus according to claim 7, wherein the baffle is attached to the oven door.

9. The cooking apparatus according to claim 1, wherein the heated air source is provided at a lower height than the flue such that heated air flowing from the heated air source flows upwards through the cooking chamber towards the flue.

10. The cooking apparatus according claim 1, wherein the baffle is removably deployed in said heated air flow path to deflect heated air.

11. The cooking apparatus according to claim 1, wherein the oven is a portable oven.

12. The cooking apparatus according to claim 1, wherein the oven is a pizza oven, the cooking chamber being configured for cooking one or more pizzas.

13. The cooking apparatus according to claim 1, wherein the heated air source comprises a fuel burner.

14. The cooking apparatus according to claim 13, wherein the fuel burner is configured to burn one or more of the following combustible fuels: wood chips, wood pellets, coal, split wood, twigs, gas, oil.

* * * * *